J. KNOWLSON, Jr.,

Assignor to LIDGERWOOD MANUFACTURING CO.

ROPE DRUM FOR WINDLASSES.

No. 9,806. Reissued July 19, 1881.

WITNESSES:

John Blake

W. F. Hapgood

INVENTOR:

John Knowlson Jr.

BY Gifford & Gifford

ATTORNEYS.

THE NORRIS PETERS CO., WASHINGTON, D. C.

UNITED STATES PATENT OFFICE.

JOHN KNOWLSON, JR., OF TROY, ASSIGNOR TO LIDGERWOOD MANUFACTURING COMPANY, OF NEW YORK, N. Y.

ROPE-DRUM FOR WINDLASSES.

SPECIFICATION forming part of Reissued Letters Patent No. 9,806, dated July 19, 1881.

Original No. 150,765, dated May 12, 1874. Application for reissue filed December 9, 1880.

*To all whom it may concern:*

Be it known that I, JOHN KNOWLSON, Jr., of Troy, Rensselaer county, and State of New York, have invented a new and Improved Hoisting-Drum, of which the following is a specification.

Heretofore hoisting-drums have been arranged loosely on shafts driven by power, and have been connected with the shafts by friction-connections constructed by interposing wood between the drums and wheels keyed fast to the shafts, the friction-connections being made and broken by the longitudinal motion of the drums on the shafts.

This invention relates to a peculiar arrangement of the wood on the wheel keyed to the shaft, and its combination with the drum, whereby the friction-connection is greatly improved both as to efficiency and durability.

It consists in the peculiar construction and arrangement of parts hereinafter more fully described, and then pointed out in the claims.

Figure 1:
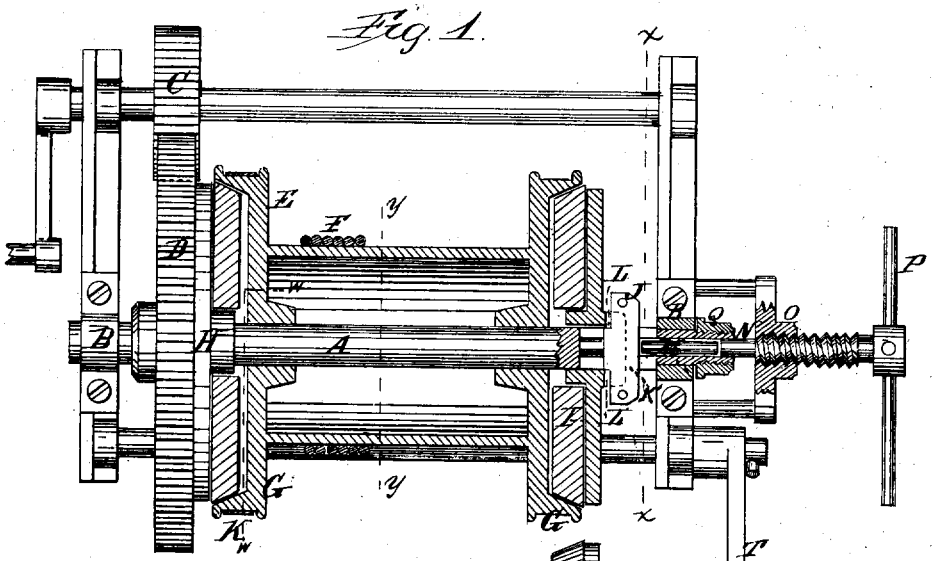
Figure 2:
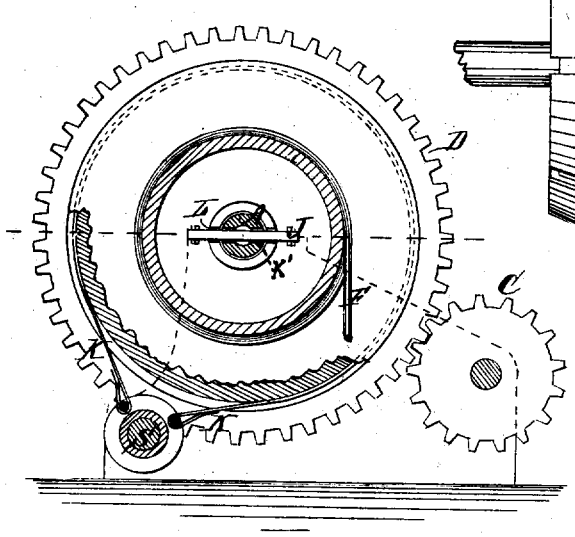
Figure 2:
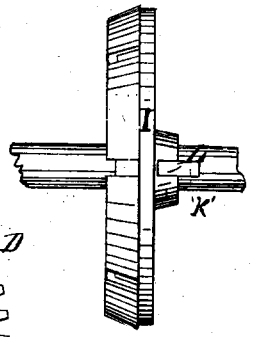
Figure 3:
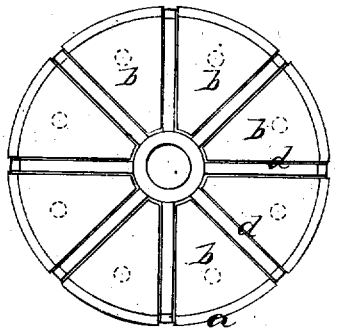

Figure 1 is a longitudinal sectional view of my improved hoisting-drum. Fig. 2 is a transverse section, the shaft being intersected on the line *x x*, and the drum on the lines *y y* and *w w* of Fig. 1. Fig. 3 is a side elevation of one of the wheels having the wooden sections attached.

A is a shaft, which is mounted in bearings B, and is continuously revolved by the wheels C and D, which are operated by driving-power in any suitable way.

E is the drum for the rope F. Said drum is provided with a conical friction-flange, G, at each end, and arranged loosely on the shaft, so that the latter can turn without it; also, so that it can slide lengthwise of said shaft to some extent.

H represents one of the wheels to which the wooden sections are attached, which wheel H is keyed fast to the shaft. I is a similar wheel, movable longitudinally on the shaft. The latter is prevented from turning on the shaft by the key J, which works in a slot, K′, through the shaft, and engages in slots L in the hub of the wheel. This key is pushed forward against the wheel by the rod M in a central hole in the shaft A, and the rod is pushed forward by the screw-pin N working in the stationary nut O, and turned by the arms P. The endwise thrust on the shaft is sustained by the collar of the nut Q screwing on said shaft against the bearing B.

K is the friction-strap for stopping and holding the drum. It is worked by the shaft S and lever T. For clutching the drum to the shaft the screw-pin N is turned so as to press the wheel I against the drum, and the latter against the wheel H, and for releasing it the screw is reversed.

*b b b* are sections of wood which are secured to the faces of the wheels H and I, preferably by bolts, and which together form a wooden disk on each wheel having its periphery turned off at an angle corresponding with the angle of the conical friction-flange G. The sections of wood are preferably made to have their inner ends rest on the hubs of the wheels H and I, which constitute a rear support against the inward pressure of the flanges G, and the wheels H and I are preferably made with flanged metal pieces *d* between the sections of wood for still better driving power.

By the construction here shown a conical friction-surface is obtained, by means of which the end pressure of the journals of the shaft carrying the drum is reduced to a minimum, and at the same time the advantage of the use of wood for the friction-surface is secured, whereas when a V-shaped flange pressing into a correspondingly-shaped groove, such as has heretofore been employed is used, the entire pressure of the brake is exerted endwise on the journals of the shaft, creating much friction between the journals and the boxes, which friction is avoided by the use of my construction. I do not, however, claim to be the first to employ a conical friction-surface, as I am aware that metallic conical friction-surfaces have before been used; but there are serious objections to the use of metal against metal as a friction-surface, which are overcome by my invention, which combines the advantages of both the conical and the wood friction-surfaces.

Having thus described my invention, I claim as new and desire to secure by Letters Patent—

1. The drum having the conical friction-flange G, in combination with the conical friction-surface formed of sectors of wood secured to a wheel on the shaft, substantially as described.

2. The combination, with the movable disk-clutch I turning with the shaft A, of the bracket-nut O, the screw having the end pin, N, the nut Q, the key J, the shaft A, having slot K, and the pin or rod M, as and for the purpose described.

3. The combination, with the drum having the conical flange G, of the conical wooden friction-surface attached to the face of wheel, and having a rear support to sustain the inward thrust of the conical flange against the conical wood friction-surface, substantially as described.

4. In combination with a drum having a conical flange, G, a conical friction-surface composed of sectors of wood attached to the face of the wheel, and separated by the flanges *d* *d*, substantially as described.

JOHN KNOWLSON, JR.

Witnesses:
N. DAVENPORT,
WM. H. HOLLISTER, Jr.